United States Patent [19]

Taurinskas

[11] Patent Number: 4,569,103
[45] Date of Patent: Feb. 11, 1986

[54] CRAB LEG KNIFE

[76] Inventor: David Taurinskas, 682 Selby Ave., St. Paul, Minn. 55104

[21] Appl. No.: 650,416

[22] Filed: Sep. 14, 1984

[51] Int. Cl.$^4$ ............................................. A22C 29/02
[52] U.S. Cl. ..................................................... 17/73
[58] Field of Search ................... 17/71, 73, 72, 48, 66, 17/69, 75; 30/278, 299

[56] References Cited

U.S. PATENT DOCUMENTS

| 40,163 | 10/1863 | Fitch . | |
|---|---|---|---|
| 296,492 | 4/1884 | Wheeler . | |
| 1,843,223 | 2/1932 | Hasseler . | |
| 4,172,306 | 10/1979 | Hopkins | 17/73 |
| 4,200,961 | 5/1980 | Mueller | 17/73 |

Primary Examiner—Willie G. Abercrombie
Attorney, Agent, or Firm—Kinney & Lange

[57] ABSTRACT

A table utensil is used to cut open a crab leg in a smooth and continuous manner. The utensil includes a handle and a blade with the blade having a pair of prong sections separated by a slot. The prong sections have inwardly facing curved edges, curved in a like direction.

20 Claims, 2 Drawing Figures

CRAB LEG KNIFE

REFERENCE TO CO-PENDING APPLICATION

Reference is hereby made to a co-pending design application filed on even date herewith having Ser. No. 650,415.

BACKGROUND OF THE INVENTION

1. Field of the Invention.

The present invention relates generally to a table utensil, and more particularly to a knife for opening the shells of shelled delicacies such as crab legs.

2. Description of the Prior Art.

Crab legs, lobsters and other such shelled delicacies are often served in their shell, which must be opened in order to remove the edible portion. Several types of utensils have been employed in the past for opening these shells.

One such utensil is a knife described in U.S. Pat. No. 4,172,306 to Hopkins. The knife includes a planar blade with an open ended slot extending linearly from a terminal end of the blade along the longitudinal axis of the blade for an inch or two. The slot symmetrically divides the blade into two identical sections. In use, one section of the knife is inserted into the interior of the crab leg, with the other section straddling the exterior of the shell. By lifting upwardly on the knife, the knife is rotated about its terminal end, and acts as a lever to break the shell. However, because a pointed edge is formed at the terminal end of the external fork by the linear slot, lifting of the utensil causes the pointed edge to pierce the shell of the crab leg and results in an interrupted movement in opening the shell. In addition, damage of the edible portions inside can result since the ends of the sections rotate into the crab meat.

Another type of utensil for removing meat from shells is described in U.S. Pat. No. 4,200,961 to Mueller. The Mueller Patent discloses a lobster fork having a plurality of generally parallel tines, and an outermost claw tine. The claw tine is shorter than and angled away from the other tines. To break open a shell, an edge of the shell is inserted between the claw tine and the parallel tines, and the utensil is used as a lever in a manner similar to the Mueller knife. However, because the claw tine is shorter than and diverges from the parallel tines, the fork neither properly grips nor provides proper leverage for narrow, elongated crab leg shells. The diverging claw tine also tends to project into the edible portions of the crab leg.

U.S. Pat. No. 1,843,223 to Hasseler describes a knife having a main blade bifurcated at one end by a longitudinally elongated notch to form a small blade. The sides of the notch extend substantially parallel to one another and are sharpened to provide oppositely disposed cutting edges. The inner end of the notch is a sharpened straight edge which extends substantially oblique with respect to the longitudinal axis of the blade. The sharpened edges of the blade around the notch are arranged to engage and slit the skin of an animal. Because of the hardness of crab leg shells, the cutting action of this type of knife is ineffective. The blades also have pointed, sharpened outer edges, which would result in an interrupted cutting movement due to piercing of the shell by the pointed end of the small blade.

U.S. Pat. No. 296,492 to Wheeler and U.S. Pat. No. 40,163 to Fitch, describe ripping instruments having a blade with diverging sections for use in ripping garment seams. The diverging blades are not suitable for use in breaking open crab legs due to the relatively small diameter of the crab leg. If used to open a crab leg, the blade section inserted into the crab leg would greatly damage the meat portion inside due to its diverging disposition.

SUMMARY OF THE INVENTION

The crab leg knife of the present invention comprises a handle and a blade extending from the handle. The blade includes an upper and a lower prong with each prong having an inwardly facing curved edge. Curved in a like direction defining a shell receiving slot.

In use, the lower prong is inserted into the shell with the upper and lower prongs straddling opposite sides of the shell. The handle is lifted upwardly with the upper prong serving as a lever, drawing the lower prong through the shell. The inner curved surface of the lower prong cuts through the shell. After a first portion of the shell is cut, the blade is moved further along the shell, and the operation is repeated.

DETAILED DESCRIPTION OF THE PREFERRED EMBODIMENTS

Figure 1:
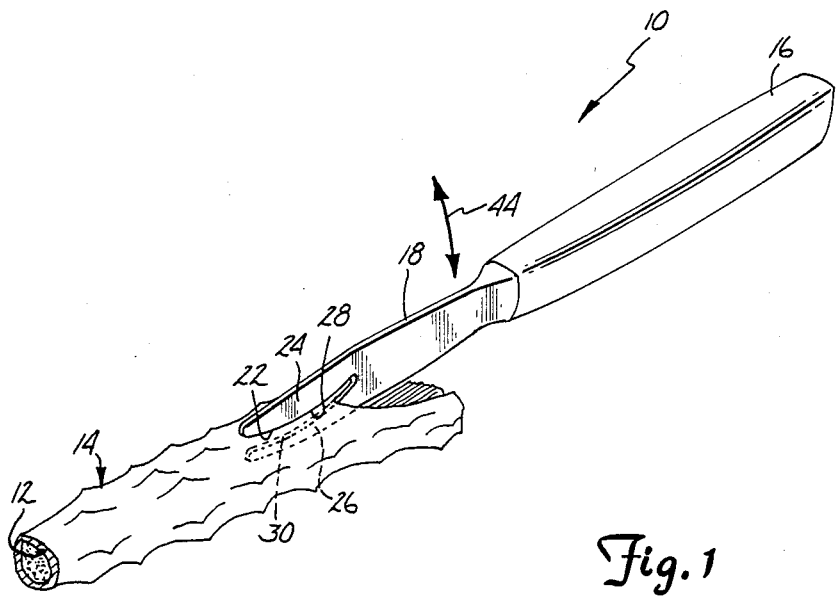
FIG. 1 is a perspective view illustrating the crab knife of the present invention in use.
Figure 2:
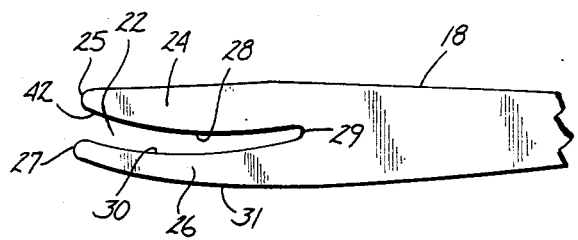
FIG. 2 is a side view of a portion the crab knife.

A crab knife 10 of the present invention is shown in use in FIG. 1 illustrating opening a shell 12 of a section of a crab leg 14 to gain access to the edible portions within. The knife 10 includes a handle portion 16 and a substantially planar blade portion 18 extending from the handle 16. The blade portion 18 includes an upper prong 24 and a lower prong 26 separated by a slot 22 extending inwardly from rounded end portions 25 and 27 of the blade portions 24 and 26, respectively, and ending at a point 29 where the upper and the lower prongs 24 and 26 join each other, as best illustrated in FIG. 2.

The upper prong 24 has an inwardly facing convex edge 28 and the lower prong 26 has an inwardly facing concave edge 30. The curved edges 28 and 30 meet at the point 29 to form a rounded edge defining an inward end of the slot 22. The lower prong 26 has an outwardly facing edge 31 extending from the rounded end portion 27 rearwardly. Although the edges 28 and 30 are preferably illustrated as being smooth, the edges 28 and 30 may have a roughened surface, such as a serraded configuration.

The configuration of the prongs is important to the present invention. The curved edges 28 and 30 are disposed in a diverging relationship such that the width of the slot 22 is larger near the end portions 25 and 27 than at the inward end of the slot 29. The larger size of the slot proximate the end portions 25 and 27 permits easy insertion of the shell of the crab leg between the prongs 24 and 26. The width of the slot near the end 29 is proximate the thickness of the shell so that the shell is easily cut, as is discussed subsequently. In one working embodiment, the width of the slot proximate the end portions 25 and 27 was approximately one-fourth (¼) inch while the width of the slot proximate point 29 was approximately one-sixteenth (1/16) inch.

The prong 26 defined by the curved edges 30 and 31 and the rounded end portion 27 projects in an oblique direction generally away from the longitudinal axis of the knife. The disposition of the rounded end portion 27 permits insertion of the prong 26 into the crab leg with minimum contact between the prong 26 and the meat within the crab leg. The curved end portion 27 also prevents piercing of the crab shell by the prong 26 thereby facilitating a continuous cutting action of the shell.

The rounded end portion 25 of the prong 24 along with the curved edge 28 also promote a continuous cutting action by preventing piercing of the shell by the end portion 25. Since the edge 28 is curved, the end portion 25 will not contact the shell while the edge 28 is in contact with the shell, eliminating piercing of the shell during cutting.

When the lower prong 26 is inserted into the crab leg, the edge 28 of the upper prong 24 serves as a lever by resting against the outer shell surface of the crab leg. When the handle of the crab knife is moved upwardly, the edge 30 cuts through the shell. The upper prong 24 does not pierce the crab shell when the crab knife is leveraged in an upward direction due to the curved configuration of the edge 28 as discussed above.

Further, the point 29 is preferably disposed above the lowermost portion of the curved edge 30 when the knife is positioned horizontally. With the point 29 positioned above the lowermost portion of the edge 30, a maximum portion of the edge 30 is used as a lever so that a portion of the shell is cut with a minimum of upward movement of the handle of the knife.

In addition, the lower prong 26 is relatively narrow to further minimize contact with the meat in the crab leg. In the working embodiment previously mentioned, the prong 26 was approximately one-sixteenth (1/16) inch wide proximate the end portion 27 and gradually increasing in width to approximately five-sixteenth (5/16) inch over approximately one and one-half (1½) inches of length.

It is preferred that the longitudinal depth of the slot 22 and the length of the upper and lower prongs be in the approximate range of one to two inches, other suitable depths and lengths may be employed. For example, in one working embodiment, the depth of the slot 22 is approximately one and one-half (1½) inches.

In choosing the depth of the slot and the length of the prongs, it should be taken into consideration that a significant quantity of shell should be cut with each movement and that the movement of the knive upwardly should be kept at a minimum so that subsequent insertion of the uncut portion of the shell into the slot proceeds in a smooth and continuous manner.

Preferably, the crab knife 10 is of a one-piece construction made of stainless steel in the same manner as conventional eating utensils, such as knives and forks. However the crab knife can be made of any suitable material with the width of the blade and the upper and lower prongs along with the physical characteristics of the material being such that the prongs are sufficiently rigid to cut through the shell of the crab leg. Other suitable materials include other metals and rigid plastics. In addition, the knife may be of a two-piece construction with the handle being made of wood and the blade being made of metal or plastic.

In operation, the blade 18 is aligned with the longitudinal axis of the crab leg and the lower prong is inserted into the crab leg with the shell 12 extending into the slot 22 and the prongs 24 and 26 straddling opposite sides of the shell 12. The handle 18 is used as a lever and is lifted upwardly causing the knife 10 to rotate or "roll" about a fulcrum 42. The fulcrum 42 is located at a point where the edge 28 touches an outer surface of the shell and moves forwardly along a point of contact as the shell is cut. Since the fulcrum 42 is located along the curved edge 28, the distal end portion 25 of upper prong 24 is prevented from penetrating the shell 12 when the handle is lifted upwardly.

Using the handle 18 as a lever and the edge 28 as a fulcrum draws the edge 30 of the lower prong 26 upwardly through the shell 12, breaking or cutting the shell 12 along the edge 30. The handle 18 is lifted upwardly until the cutting of the shell by the edge 30 has stopped. The knife 10 is then rotated back to its original position and moved forwardly inserting a further uncut portion of the shell between the edges 28 and 30. The operation is then repeated with the knife 10 being rotated reciprocally about fulcrum 42, as indicated by arrows 44 in FIG. 1, while it is advanced along uncut portions of the shell 12. Upon completion of the operation, shell 12 is fully opened, providing ready access to the edible portions within the shell 12. If two cuts are made along each side of shell 12, a portion of shell 12 may simply be lifted away to expose the edible portions.

As will be easily understood from the above description of the use of the crab knife 10 of the present invention, the knife 10 easily cuts the shell of a crab leg in a smooth and continuous fashion. The meat within the crab shell remains undamaged and the blade of the knife is moved forwardly along the shell, cutting the shell with a minimal amount of effort.

Although the present invention has been described with reference to the preferred embodiments, a person skilled in the art will recognize the changes to be made in the form and detail without departing from the spirit and scope of the present invention.

What is claimed is:

1. A device for opening a shell of a crab leg and similar objects, the device comprising:
    a handle portion; and
    a blade portion extending from the handle portion and having an upper and lower prong with each prong having an inwardly facing curved edge, curved in a like direction defining a shell receiving slot wherein the curved edge of the upper prong has a convex configuration, and the curved edge of the lower prong has a concave configuration.

2. The device of claim 1 wherein the blade portion is substantially planar.

3. The device of claim 1 wherein the upper and lower prongs each have rounded end portions and the slot extends from the rounded end portions inwardly terminating at a junction of the upper and lower prongs.

4. The device of claim 3 wherein the slot is wider proximate the rounded end portions than proximate the junction of the upper and lower prongs.

5. The device of claim 1 wherein the blade portion and handle portion are of an integral construction.

6. The device of claim 1 wherein the lower prong has an outwardly facing convex edge on a side opposite from the inwardly facing concave edge.

7. The device of claim 1 wherein the curved edges are disposed in a diverging relationship.

8. A device for opening a shell of a crab leg, the device comprising:
    a handle portion; and
    a blade portion attached to the handle portion and having first and second distal prong sections with the first prong section having an inwardly facing convexly curved edge and the second prong section having an inwardly facing concavely curved edge defining a slot therebetween with the convexly curved edge acting as a fulcrum and the handle portion acting as a lever and the concavely curved edge acting as a cutter to cut the shell of the crab leg.

9. The device of claim 8 wherein the first and second prong sections each have a rounded end portion.

10. The device of claim 9 wherein the second prong section has an outwardly facing convexly curved edge extending from the curved end rearwardly.

11. The device of claim 9 wherein the convexly curved edge and the concavely curved edge are disposed in a diverging relationship.

12. A device for opening a shell of a crab leg and similar objects, the device comprising:
 a handle portion; and
 a blade portion extending from the handle portion and having an upper and lower prong with each prong having an inwardly facing curved edge, curved in a like direction defining a shell receiving slot wherein the upper and lower prongs each have rounded end portions and the slot extends from the rounded end portions inwardly terminating at a junction of the upper and lower prongs.

13. The device of claim 12 wherein the blade portion is substantially planar.

14. The device of claim 12 wherein the slot is wider proximate the rounded end portions than proximate the junction of the upper and lower prongs.

15. The device of claim 12 wherein the blade portion and handle portion are of an integral construction.

16. The device of claim 12 wherein the curved edges are disposed in a diverging relationship.

17. A device for opening a shell of a crab leg and similar objects, the device comprising:
 a handle portion; and
 a blade portion extending from the handle portion and having an upper and lower prong with each prong having an inwardly facing curved edge, curved in a like direction defining a shell receiving slot wherein the lower prong has an outwardly facing convex edge on a side opposite from the inwardly facing concave edge.

18. The device of claim 17 wherein the blade portion is substantially planar.

19. The device of claim 17 wherein the blade portion and handle portion are of an integral construction.

20. The device of claim 17 wherein the curved edges are disposed in a diverging relationship.

* * * * *